(12) United States Patent
Boss et al.

(10) Patent No.: US 11,028,590 B1
(45) Date of Patent: Jun. 8, 2021

(54) ROOFING SYSTEM WITH CHANGEABLE DECORATIVE ELEMENTS

(71) Applicant: Building Materials Investment Corporation, Dallas, TX (US)

(72) Inventors: Daniel E. Boss, Morris Township, NJ (US); Kevin A. Pollack, Dallas, TX (US); Denis Tibah, Waxahachie, TX (US); Trieu Nguyen, Plano, TX (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

(21) Appl. No.: 17/134,817

(22) Filed: Dec. 28, 2020

Related U.S. Application Data

(60) Provisional application No. 62/954,762, filed on Dec. 30, 2019.

(51) Int. Cl.
*E04D 3/35* (2006.01)
*E04D 3/04* (2006.01)
(Continued)

(52) U.S. Cl.
CPC .............. *E04D 3/351* (2013.01); *B32B 3/06* (2013.01); *B32B 7/08* (2013.01); *B32B 7/12* (2013.01);
(Continued)

(58) Field of Classification Search
CPC .. E04D 3/351; E04D 3/35; E04D 3/04; E04D 3/16; E04D 3/18; E04D 3/361;
(Continued)

(56) References Cited

U.S. PATENT DOCUMENTS 3,434,259 A * 3/1969 Corbin ...................... E04D 1/29
52/420
4,735,838 A * 4/1988 Roberts ................... B32B 11/04
428/40.3
(Continued)

FOREIGN PATENT DOCUMENTS

| CN | 108149849 A | 6/2018 |
| FR | 2569218 A1 | 2/1986 |
| JP | 2006-328104 A | 12/2006 |

OTHER PUBLICATIONS

International Search Report and the Written Opinion of the International Search Authority for PCT/US2020/067151 dated Mar. 10, 2021.

*Primary Examiner* — Beth A Stephan
(74) *Attorney, Agent, or Firm* — Womble Bond Dickinson (US) LLP (57) ABSTRACT

A roofing system comprises layered construction panels, each having a bottom structural layer to provide strength and support. A performance layer overlies the structural layer and provides performance or functional characteristics such as water proofing, water shedding and/or impact resistance. An upper or decorative layer overlies the performance layer and provides aesthetic features or a decorative appearance for the roofing system. The decorative layer of the construction panels can be removed without damaging or affecting the performance layer. The appearance of a roof can thereby be changed at will without requiring that the entire roofing system be removed and replaced.

8 Claims, 5 Drawing Sheets

(51) Int. Cl.
*E04D 3/16* (2006.01)
*E04D 3/18* (2006.01)
*B32B 7/12* (2006.01)
*B32B 7/08* (2019.01)
*B32B 27/06* (2006.01)
*B32B 3/06* (2006.01)
*E04D 3/361* (2006.01)

(52) U.S. Cl.
CPC ............ *B32B 27/06* (2013.01); *E04D 3/04* (2013.01); *E04D 3/16* (2013.01); *E04D 3/18* (2013.01); *E04D 3/361* (2013.01); *B32B 2419/06* (2013.01)

(58) Field of Classification Search
CPC .... E04D 1/28; B32B 3/06; B32B 3/08; B32B 7/06; B32B 7/08; B32B 7/12; B32B 27/06; B32B 2419/06; B32B 2607/00
See application file for complete search history.

(56) References Cited

U.S. PATENT DOCUMENTS

| | | | |
|---|---|---|---|
| 5,671,577 A * | 9/1997 | Todd | E04D 1/12 52/519 |
| 6,990,779 B2 | 1/2006 | Kiik et al. | |
| 7,803,239 B2 * | 9/2010 | Scheirer | E04D 5/12 156/71 |
| 8,171,689 B2 | 5/2012 | Pierson et al. | |
| 8,206,539 B2 | 6/2012 | Kalkanoglu | |
| 8,426,017 B2 | 4/2013 | Paradis et al. | |
| 8,470,436 B1 | 6/2013 | Paradis et al. | |
| 8,713,882 B2 | 5/2014 | Kalkanoglu et al. | |
| 8,869,478 B2 | 10/2014 | Gianolio | |
| 9,032,679 B2 | 5/2015 | Propst | |
| 9,404,261 B2 | 8/2016 | Johnson et al. | |
| 9,534,378 B2 * | 1/2017 | Humphreys | E04D 5/10 |
| 9,840,851 B2 | 12/2017 | Propst | |
| 9,890,537 B2 | 2/2018 | Martin et al. | |
| 10,087,634 B2 | 10/2018 | Johnson et al. | |
| 2002/0189185 A1 | 12/2002 | Hunter, Jr. | |
| 2004/0055240 A1 * | 3/2004 | Kiik | D06N 5/00 52/545 |
| 2004/0172908 A1 * | 9/2004 | Swann | E04D 5/12 52/518 |
| 2006/0096213 A1 * | 5/2006 | Griffin | E04D 3/355 52/409 |
| 2006/0141191 A1 * | 6/2006 | Seth | B32B 27/32 428/40.1 |
| 2006/0275561 A1 * | 12/2006 | Agrawal | B32B 5/18 428/2 |
| 2008/0081152 A1 * | 4/2008 | Khan | B32B 11/10 428/143 |
| 2008/0209835 A1 * | 9/2008 | Margarites | E04D 1/36 52/518 |
| 2013/0217318 A1 | 8/2013 | Edwards et al. | |
| 2017/0326836 A1 | 11/2017 | Wilde et al. | |
| 2018/0283026 A1 * | 10/2018 | Mathieson | B32B 5/26 |

* cited by examiner

ROOFING SYSTEM WITH CHANGEABLE DECORATIVE ELEMENTS

REFERENCE TO RELATED APPLICATION

The present Patent application claims the benefit of and Priority to U.S. Provisional Patent Application No. 62/954,762, filed on Dec. 30, 2019.

INCORPORATION BY REFERENCE

The disclosures made in U.S. Provisional Patent Application No. 62/954,762, filed on Dec. 30, 2019, are specifically incorporated herein by reference, as if fully set forth in their entirety.

TECHNICAL FIELD

This disclosure relates generally to roofing systems, and more particularly to roofing systems wherein aesthetic functions and performance functions are carried out and/or provided by different and separable elements of the roofing system.

BACKGROUND

In conventional roofing systems, the performance functions (e.g. water shedding, weather barrier, impact resistance) and the decorative functions (e.g. appearance, texture, color) of an installed roof generally are carried out by the same component of the roofing system. In an asphalt shingled roofing system, for instance, the performance functions and the decorative element(s) are each embodied in the individual shingles of the roofing system. As a consequence, changing the appearance of a roof can require replacing the entire roofing system or at least a majority of the roofing system of a roof. In other words, the entire roofing shingle system must be taken off and replaced to change the appearance of the roof. Furthermore, if only a section of a shingled roof is damaged, the entire roof usually must be replaced to comply with manufacturer's warranties for the roofing materials and systems.

A need exists for a roofing system wherein a decorative element or component providing aesthetic characteristics of the roofing system can be removed and replaced without affecting the performance or functional components of the roofing system. It is to the provision of such a roofing system that the present disclosure is primarily directed.

SUMMARY

Briefly described, systems are disclosed including layered construction panels or components. For example, in one embodiment a roofing system includes roofing panels mountable to a roof deck or substrate. The roofing panels will be made up of layered components, including a structural layer or base overlaid by a performance layer or functional layer that further is overlaid by a separable or removable and replaceable decorative layer or element. The decorative layer or element is configured to be removable from the performance layer and replaced with another decorative element without the need to replace the performance layer or the structural layer of the roofing system, and without substantively affecting the performance or functional characteristics of the performance layer. In an embodiment, the layered components are incorporated into a roofing panel for a roofing system, such that damaged portions of a roof formed or constructed with the roofing system can be replaced without replacing the entire roofing system.

Embodiments allow for on-site repair of the performance layer. In some embodiments, the performance layers of individual panels also can be sealed together on-site to form a roof that is substantially impermeable to water and air.

The disclosed systems further are useful both for roofing and exterior wall or building envelop applications in both residential and commercial buildings. Thus, the panels of the disclosed systems may be referred to more broadly as construction panels, even though they are described within the context of roofing in this disclosure.

In addition, in some aspects, a layered construction panel is provided, comprising a base layer of material having structural characteristics; a performance layer of material overlying the base layer of material, the performance layer of material having one or more performance or functional characteristics; and a decorative layer of material overlying the performance layer of material and having aesthetic characteristics. The decorative layer of material additionally can be selectively removable and replaceable with another decorative layer of material, without affecting the functional characteristics of the performance layer of material, so that the aesthetic characteristics of the construction panel can be altered without replacing the performance layer of material or the base layer of material.

In some embodiments of the layered construction panel, the base layer comprises a structural material such as wood, polymer materials, concrete, metals, structural foams, or other materials. In still further embodiments, the base layer of the layered construction panel can comprise plywood or oriented strand board, while in other embodiments, the base layer can be formed as a structural insulated panel or other structural panel.

In other embodiments, the layered construction panel can comprise a roofing panel; or can comprise a building wall or other structural panel. In addition, the performance or functional characteristics of the layered construction panel can comprise waterproofing, water shedding, impact resistance, and/or combinations thereof. Still further in some embodiments, the aesthetic characteristics can comprise the appearance of traditional construction materials. For example, in embodiments, the appearance of such traditional construction materials can comprise the appearance of roofing materials, which can include, but are not limited to, shingles, shakes, slate, metal roofing, tile roofing or other materials, and/or combinations thereof.

In some embodiments of the layered construction panel, the decorative layer can be attached with selectively removable fasteners. In other embodiments of the layered construction panel, the decorative layer can be attached with a selectively debondable adhesive. In still other embodiments, the decorative layer can include multiple layers or decorative elements or components.

Additionally, in embodiments, the layered construction panel can include a performance layer of material that comprises one or more thermoplastic polymers. For example, the thermoplastic polymers can comprise polyethylene, polypropylene, acrylic, PET, polystyrene, polyvinyl chloride, polyisoprene, polyvinyl butyral, polycarbonates, multilayer thermoplastic constructions, and combinations thereof with and without fillers.

In other aspects, a roofing system can be provided, comprising a roof deck; a plurality of panels positioned along the roof deck, each of the panels comprising a base layer; a performance layer positioned over the base layer, with the performance layer configured to provide at least one functional characteristic; and a decorative layer overlying the performance layer and configured to provide one or more aesthetic characteristics; wherein the decorative layer is coupled to the performance layer such that the decorative layer can be replaced for altering the one or more aesthetic characteristics without replacement of the performance layer or the base layer.

In some embodiments of the roofing system, the one or more aesthetic characteristics comprise an appearance of roofing shingles, shakes, slate, metal roofing, tile roofing, colors, textures, images, or combinations thereof.

In addition, in embodiments of the roofing system, each of the panels further can comprise debondable adhesives, removable fasteners, releasable connectors, and/or combinations thereof, for releasibly coupling the decorative layer to the base layer of each panel. Still further, the decorative layer also can be heat or thermally bonded to the performance layer.

Accordingly, a system, such as a roofing system, and layered construction panels are disclosed that satisfy the above mentioned and other needs, and that provide other potential advantages heretofore not common in construction. The foregoing and various other features, aspects and advantages of the present disclosure will be further understood upon a review the following detailed description, when taken in conjunction with the accompanying drawing figures, which are briefly described as follows.

BRIEF DESCRIPTION OF THE DRAWINGS

It will be appreciated that for simplicity and clarity of illustration, elements illustrated in the figures are not necessarily drawn to scale. For example, the dimensions of some elements may be exaggerated relative to other elements. As those skilled in the art also will appreciate and understand, the dimensions of various features and elements of the drawings may be expanded and/or reduced to more clearly illustrate the embodiments of the present disclosure as described herein. Accordingly, embodiments incorporating the teachings of the present disclosure are shown and described below with respect to the drawings, in which:

FIG. 1b is a perspective view of the layers of the construction panel of FIG. 1a.

DETAILED DESCRIPTION

The following description taken in combination with the accompanying drawing figures is provided to assist in the understanding of the teachings disclosed herein. The description is directed to various implementations and embodiments of the present disclosure, and is provided to assist in describing such teachings, but such implementations and embodiments should not be interpreted as a limitation on the scope or applicability of the present disclosure.

Referring first to FIGS. 1a-1d, a construction panel 11 is shown, which may be configured for other like construction panels as part of a roofing system to cover the roof of a structure. The construction panel 11 has a layered construction panel structure comprising a top decorative layer or element 12 that overlies a middle performance layer 13. The performance layer 13 in turn overlies a structural or base layer 14 of the construction panel 11. While the construction panel 11 is generally illustrated on the Figures as having a substantially square or rectangular configuration, it will be understood that the construction panel can be formed with various other configurations or shapes, for example, and without limitation, hexagonal, triangular, diamond and/or other shapes, which can be selected based on application of the construction panels, customer preference, a desired decorative appearance of a roof or other building structure being constructed, and/or various other criteria.

The structural or base layer 14 may be made of any material that provides structural support for the construction panel when it is attached to structural components of a building frame such as roof deck or substrate S (FIGS. 1a and 1d), or to trusses, rafters, studs, or joints of a roof structure. For example, but without limitation, the structural or base layer can be formed of structural materials such as, without limitation, plywood or other wood materials, oriented strand board (OSB), metals, concrete, cement, composite materials, and combinations thereof. In addition to the materials mentioned above, the material of the structural layer 14 may also include various foamed panels, cement or gypsum-based panels, quartz, synthetic or composite materials, and combinations thereof.

In additional embodiments, wood materials such as plywood or OSB are used for the structural or base layer 14. Alternatively, the structural or base layer can include standing seam or contoured metal or polymer structures. In still other embodiments, the structural or base layer 14 can include structural insulated panels (SIP) or similar type panels sized and/or configured to extend across a span or roof section e.g. between spaced rafters or between a roof peak or ridge and an eave or building wall of the structure, and which can have sufficient strengths so as to be substantially self-supporting sufficient to make a reduction of the number of rafters. Thus, the rafters can be reduced and spaced at wider spacing's, or could be substantially eliminated in some embodiments.

The structural or base layer 14 further can have a thickness and size/configuration that can vary depending upon application (e.g. use as a roofing panel or building wall), structural requirements, etc. The structural or base layer further can be attached or mounted to the roof deck or substrate S such as by bonding using sealant or adhesive materials, thermal bonding, hook and loop or similar connectors, fasteners, and/or other mechanical interlocking systems.

Figure 1A:
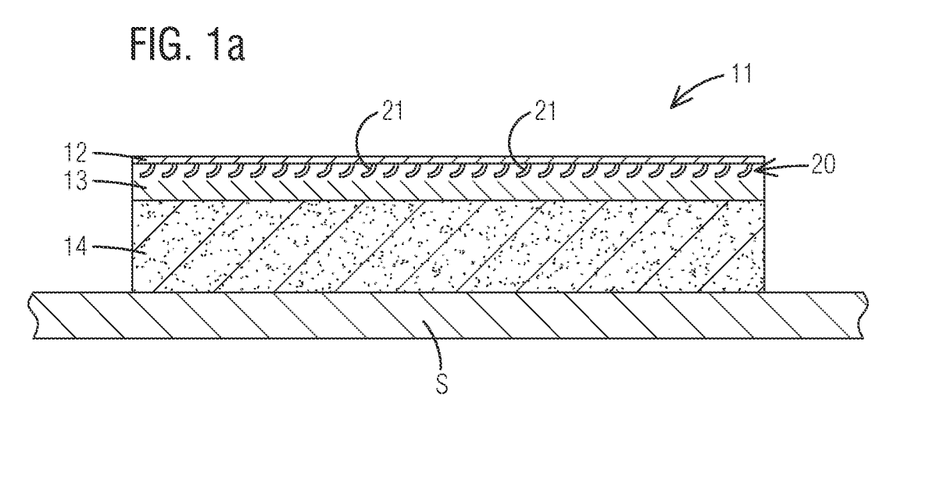
FIG. 1a is a cross-sectional view of a construction panel, such as for use in a roofing system, that embodies principles of the present disclosure in one possible embodiment.
Figure 1B:
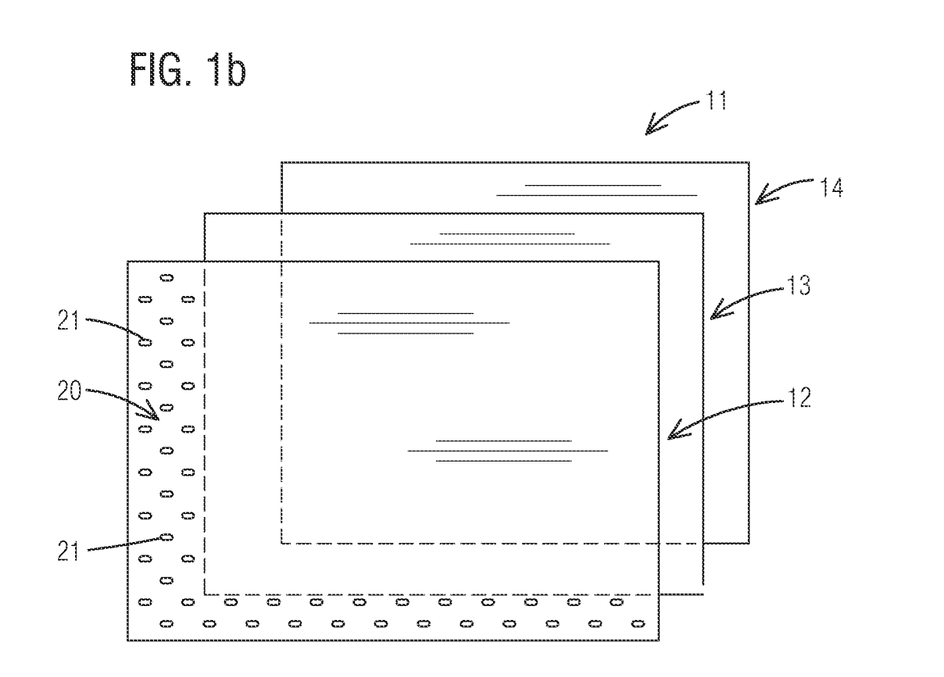
Figure 1C:
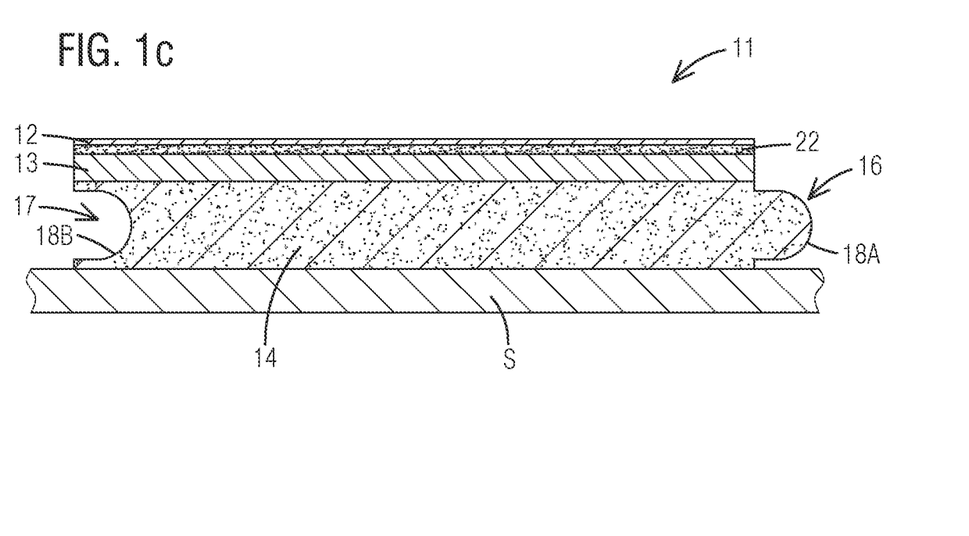
FIG. 1c is a cross-sectional view of a construction panel, such as for use in a roofing system, that embodies principles of the present disclosure in another possible embodiment.

In some non-limiting embodiments, such as shown in FIGS. 1c-1b, the structural or base layers 14 of adjacent panels also can be formed with a tongue 16 and groove 17 defined along opposing side edges 18A/18B, or other mating edge profile configured to enable the base layers 14 of the construction panels 11 to nest and/or fit together in meshing or interlocking engagement. In addition, or alternatively, the structural or base layers 14 of adjacent panels can include a spline, key, or other engagement feature that can be pressed into a locking groove or recess to create a frictional interlock or engagement with other panels and/or the roof deck. Sealant or adhesive materials or strips further can be positioned or applied along the side edges of the structural or base layers to help secure the structural or base layers of adjacent panels together.

The performance layer 13 is configured to provide one or more selected performance characteristics or functional aspects of a roofing system made of the construction panels 11. Such performance characteristics include, but not limited to, waterproofing, water shedding, and impact resistance, wind resistance, algae or microbial resistance, weathering and/or fire resistance or retardant characteristics or functions. The performance layer 13 may be composed of a single layer class or mixture of materials including polymers, metals, composite materials with or without organic or inorganic fillers. Non-limiting examples of polymers include without limitation thermoplastic polymers including but not limited to polyethylene, polypropylene, acrylic, PET, polystyrene, polyvinyl chloride, polyisoprene, polyvinyl butyral, polycarbonates, and multilayer thermoplastic constructions, thermoset polymers including polyesters, polyurethanes, phenolics, silicones, polyurea, vinyl esters, vulcanized rubbers, and various resins. The performance layer also can vary in thickness depending upon the application and designed and/or required performance and/or functional characteristics.

In some embodiments, the polymers of the performance layer may be composed of neat, recycled, or a combination of neat and recycled polymers. The polymers also can be glassy or rubbery. Fillers can be added to the polymer material for additional benefits such as improved durability, thermal resistance, UV stability, and microbial resistance. In some non-limiting embodiments, an appropriate polymer composition can include recycled polyvinyl butyral, neat polypropylene, cupric oxide or microbial or algae resistant fillers, fire retardant materials, colorants, dyes or tinting agents, and a perlite filler. Other fillers also can be added for adjusting mechanical properties of the performance layer, such as fatigue strength, tensile strength, modulus of elasticity and/or other mechanical properties The use of thermoplastic polymers or systems including thermoplastic polymers for the performance layer can provide additional performance and/or functional characteristics to a system in which the construction panels are used. For example, joints between performance layers of adjacent construction panels of an installed roofing or building system can be sealed via adhesives or sealants or using common welding techniques such as hot gas welding, extrusion welding, induction welding, ultrasonic welding or various other thermal bonding techniques that provide a substantially permanent and reliable water resistant seal between the construction panels. Alternatively, such joints, as well as the joints of thermoset systems, may be sealed via methods such as tape, caulk, coatings, a stamped or pressed material, and others.

In some embodiments, the performance layer 13 may be directly adhered to the structural layer 14 during manufacturing, or prior to installation. Alternatively, the performance layers (and decorative layers) can be installed on their base or structural layers in a field setting while the installation of the construction panels, for example as part of a roofing system, is ongoing.

As indicated in FIGS. 1a-1d, the decorative layer or element 12 can be releasably attached to the performance layer 13 and used primarily for decorative or aesthetic purposes; i.e. to provide the outward appearance of the roofing system. For example, the decorative layer or element 12 can include one or more selected aesthetic characteristics or features for the construction panels and the resultant structure, such as a roofing structure formed thereby. In some embodiments, the aesthetic characteristics can include, but are not limited to, coloring, tinting, a textured appearance, printed or embossed images, patterns or designs, or other decorative visual features. Still further, in some embodiments, the aesthetic characteristics can comprise the appearance of traditional construction materials. For example, in embodiments, traditional construction materials can comprise roofing materials, which can include, but are not limited to, shingles, shakes, slate, metal roofing, tile roofing or other materials, and/or combinations thereof. The decorative layer may also provide additional benefits such as aiding in water shedding, UV-resistance, and durability.

In additional embodiments, the performance layer can have various tints, colors or other aesthetic features that can be used in combination with the decorative layer to help provide varying decorative appearances or looks. For example, the performance layer can have a dark color or tint that can act as a background for a patterned image or design of the decorative layer.

In some embodiments, the decorative layer or element 12 may be applied as a film, a sheet, a panel, or individual shingles or squares of various polymer materials such as polyethylene, polypropylene, acrylics, polyester, polyethylene terephthalate (PET), polytetrafluoroethylene (PTFE) or other fluorinated films, polyvinyl butyral, and/or other, similar materials. For example, and without limitation, the decorative layer 12 can include sheet materials of varying thicknesses, such as vinyl sheets or films, woven and/or non-woven textile sheets such as mats, scrims, mesh or lattice materials with a geometric or randomized aesthetic or decorative appearance, films with embedded particles, or films or sheets that are printed or embossed with images, designs or patterns, creating a decorative appearance such as that of traditional roofing materials.

The decorative layer or element 12 also may be attached to the material of the performance layer 13 in any suitable but reversible manner such as, for instance, mechanical fasteners, reversible bonding or other adhered systems such as soluble adhesives or peel-and-stick adhesives, heat or thermal bonding, or combinations thereof. Where mechanical fasteners are used, they should be designed so that they do not substantially pierce through the material of the performance layer 13. For instance, mechanical fasteners or connectors may be adhered to the surface of the performance layer 13 and coupled to or inserted through the decorative layer, which fasteners may be designed to releasibly grip the material of the decorative layer or element 12 when the two are pressed together. In some non-limiting embodiments such as indicated in FIGS. 1a-1b, releasable connectors 20, such as snapping fasteners, hooks, clips and/or other disengageable fasteners 21 or connectors can be used to securely attach the decorative layer to the performance layer of each panel while still enabling detachment, removal and replacement of the decorative layer, without substantially affecting the performance characteristics of the panel. Additionally, in some embodiments such as shown in FIG. 1c, the decorative layer can be substantially bonded to the performance layer, as indicated at 22 in FIG. 1c, such as by heat or thermal bonding or by adhesives, sufficient to substantially integrate the decorative layer with the performance layer while still enabling removal and replacement of the decorative layer.

Figure 1D:
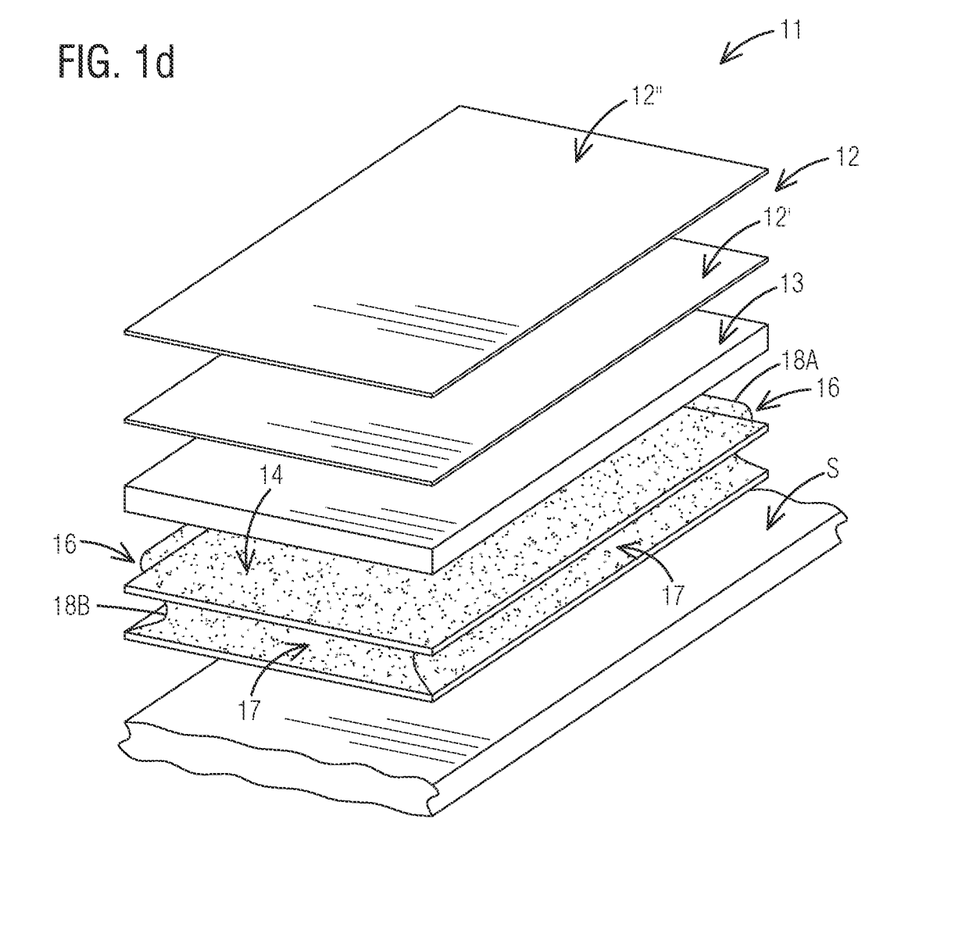
FIG. 1d is an exploded perspective view of a construction panel such as shown in FIG. 1c, with an additional decorative layer shown.

In still further embodiments, such as indicated in FIG. 1*d*, the decorative layer can include multiple layers or multiple sections 12', 12", etc. that can be overlaid and/or fitted together to form the removable decorative layer 12. By way of non-limiting example, the decorative layer could comprise a series of sheets, films of layers that can be stacked to provide or create a contoured or other aesthetic design or appearance. Still further, the decorative layer or element 12 can comprise a sheet of material having various aesthetic or decorative characteristics, e.g. sheet 12', overlaid with a protective layer or coating, e.g. 12", that can be clear or have a color, pattern, image, etc. and can provide additional protection to the decorative layer, such as UV protection, impact resistance, or other properties.

With such a structure, it will be seen that the performance or functional characteristics of the construction panel is substantially provided by the performance layer 13 and the aesthetic or decorative characteristics or functional aspects of the construction panel (and thus a building structure, e.g. a roof, formed thereby) is substantially provided by the decorative layer or element 12. In other words, the performance characteristics or functions of the construction panel 11 generally can be separated from the decorative characteristics or functional aspects of the construction panel. Further, the decorative layer or element 12 is selectively removable from the performance layer 13 and, once removed, may be replaced with a new or fresh or different decorative layer or element providing an updated, new or different aesthetic characteristic or feature to each construction panel and thus the roof formed thereby, without affecting the performance characteristics or functions of the panel, and without requiring removal of the performance layer and/or base or structural layer.

Further, by separating the performance characteristics or functions of the construction panel from the decorative characteristics or functions of the construction panel, the entire roofing system does not need to be replaced when it is desired to change or update the appearance of a roof. Instead, the decorative layer or element 12 may simply be removed from the performance layer 13 and replaced with a new decorative element without affecting the performance characteristics or functions of the roofing system.

The construction panels according to the principles of this disclosure can either be fully factory assembled or can be fully or partially field assembled at a worksite. For example, in some non-limiting embodiments, the construction panels 11 can be factory-formed and shipped with their performance layers attached to their base or structural layers, and with the decorative layers separate so as to enable a customer to choose one or more aesthetic characteristics for the decorative layer, i.e. to create a selected design, pattern or other decorative appearance for their roof; and thereafter the selected decorative layers can be applied to the performance layers during installation of a roofing system.

Figure 2A:
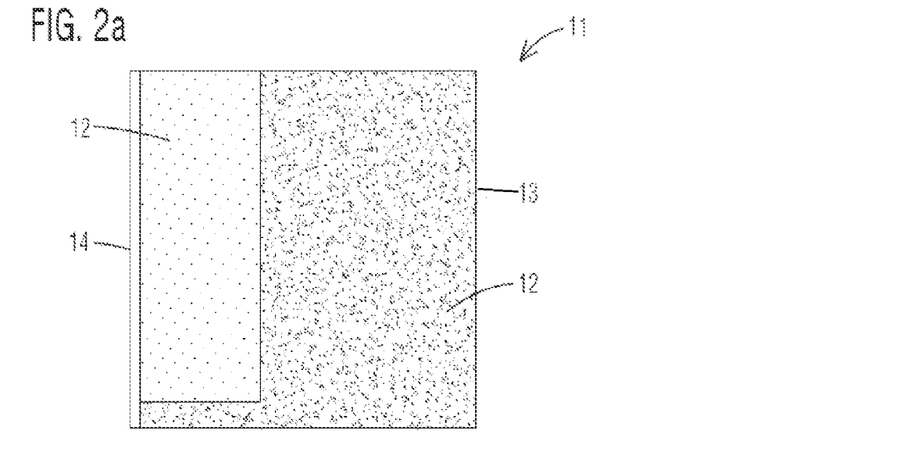
FIGS. 2a-2c illustrate further embodiments of a construction panel according to the principles of the present disclosure.
Figure 2B:
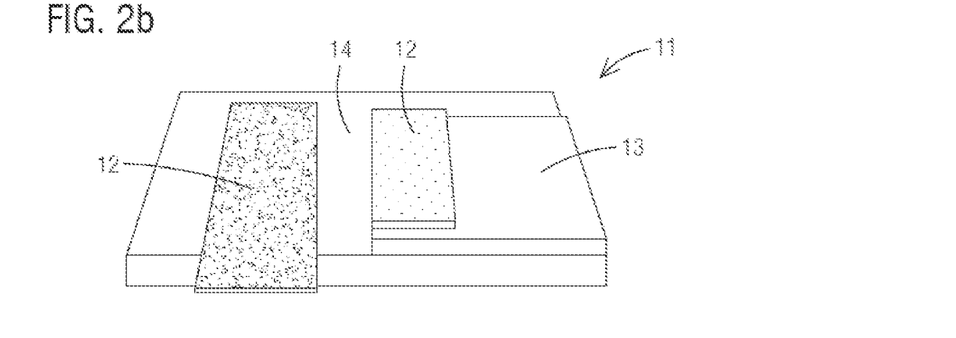
Figure 2C:
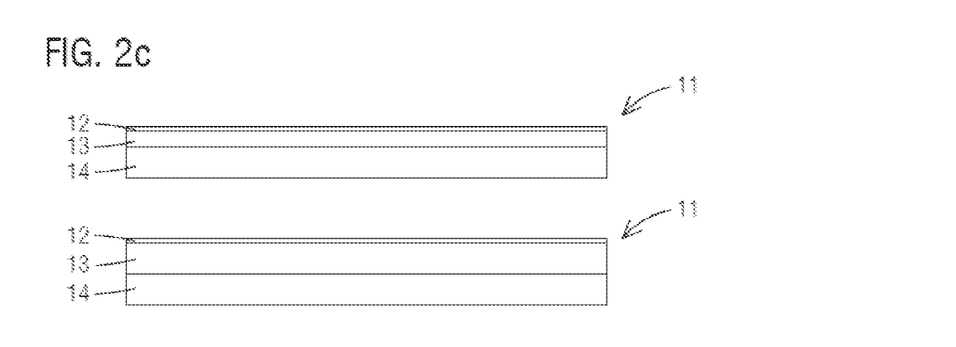

FIGS. 2*a*-2*c* illustrate one possible embodiment of a construction panel 11 according to the principles of the present disclosure. The illustrated construction panel 11 includes a performance layer 13 made of recycled polyvinyl butyral, polypropylene, and a perlite filler bonded directly to a plywood structural or base layer 14. FIG. 2*a* shows the construction panel 11 with a decorative layer 12 comprising, for example, vinyl film adhered to one side of the performance layer 13. FIGS. 2*b* and 2*c* show alternate views of the construction panel 11. The vinyl film of the decorative layer 12 can include a colored or tinted film or sheet (e.g. a light colored film is shown for purposes of illustration only), or can be formed with a textured appearance, image, and/or other decorative or aesthetic features or appearance. The decorative layer 12 further can be attached using an acrylic adhesive which was present on the vinyl film. Other debondable adhesives, releasable fasteners or connectors or other attachments also can be used.

Figure 3A:
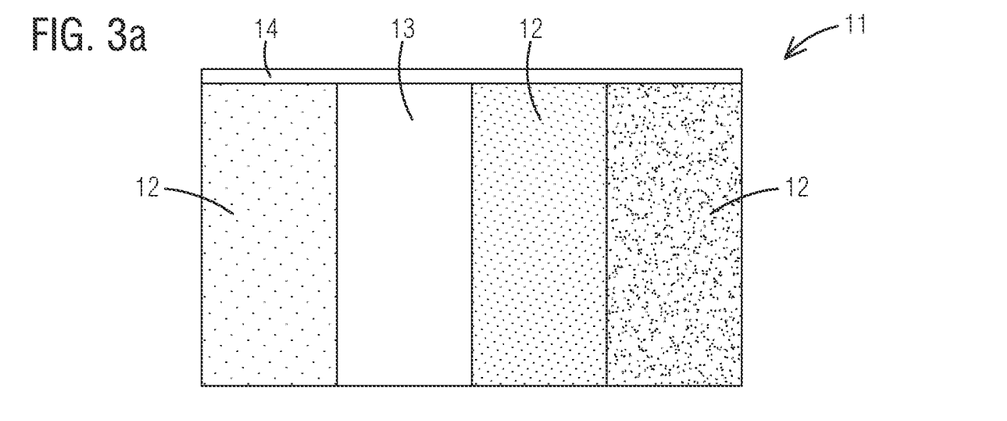
FIGS. 3a-3b illustrate another embodiment of a construction panel according to the principles of the present disclosure.
Figure 3B:
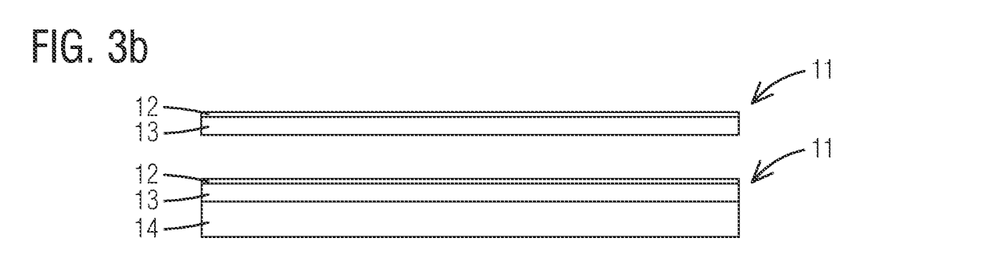

FIGS. 3*a* and 3*b* illustrate other embodiments of construction panels 11, including polypropylene sheets as a performance layer 13 adhered to a plywood base or structural layer 14. FIG. 3*a* shows two construction panels 11 of this construction with a decorative layer 12 comprising a vinyl film adhered to one side of the performance layer 13 of each panel, i.e. a top or exposed side surface thereof. FIG. 3*b* shows alternate, end views of the construction panel 11. Examples of decorative layers 12 with varying aesthetic characteristics are shown in FIG. 3*a*, including decorative layers with different colors or tints and texturing.

Figure 4A:
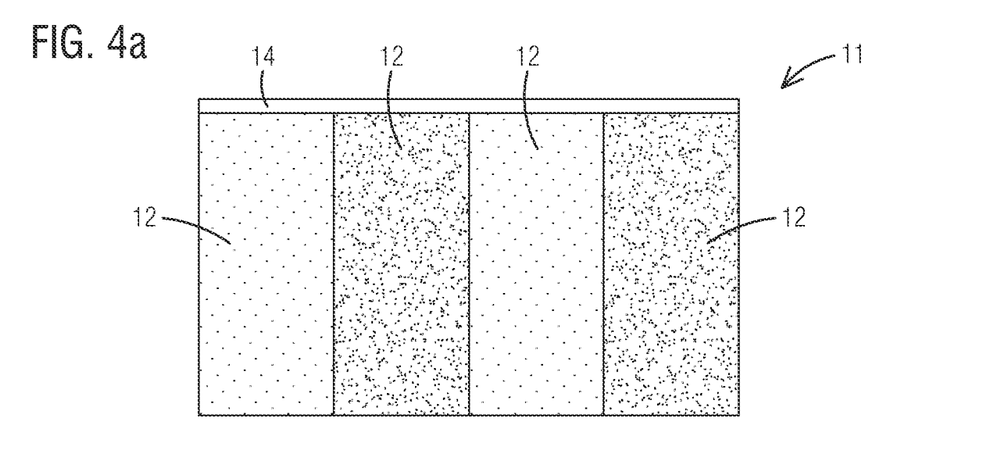
FIGS. 4a-4b illustrate another embodiment of a construction panel according to the principles of the present disclosure.
Figure 4B:
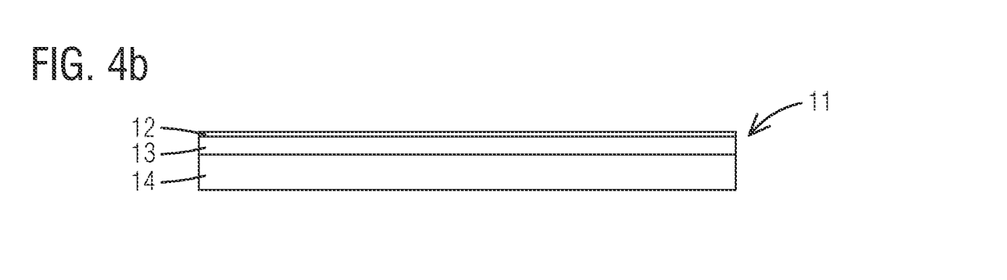

FIGS. 4*a* and 4*b* illustrate construction panels 11 made with high density polyethylene (HDPE) sheets adhered to plywood forming the performance layer 13 and structural or base layer 14, respectively. In addition, a decorative layer 12, for example, including but not limited to a vinyl film or substrate that can be attached to the performance layer using an acrylic adhesive which may be present on the vinyl film. FIG. 4*a* shows two of these construction panels 11 with a vinyl film adhered to one side. FIG. 4*b* shows alternate views of the construction panel 11. Examples of decorative layers 12 with varying aesthetic characteristics are shown in FIG. 4*a*, including decorative layers with different colors or tints, texturing, and/or an appearance of traditional roofing materials such as a shingle, shake, slate or tile.

Figure 5A:
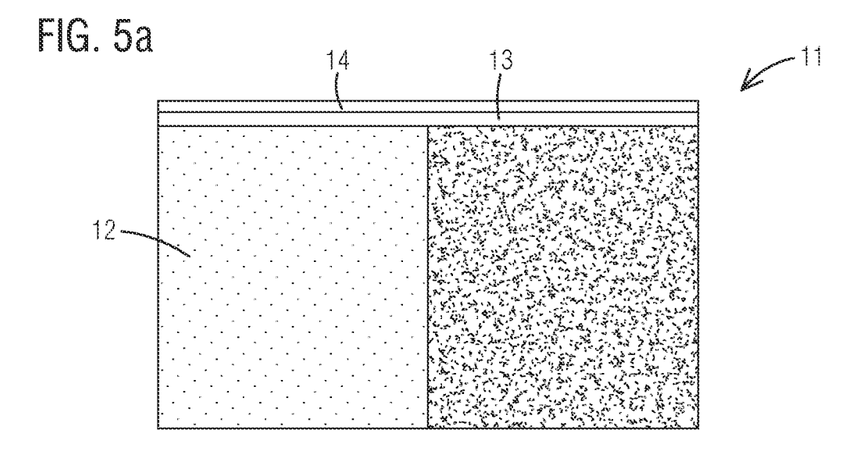
FIGS. 5a-5b illustrate still another embodiment of a construction panel according to the principles of the present disclosure.
Figure 5B:
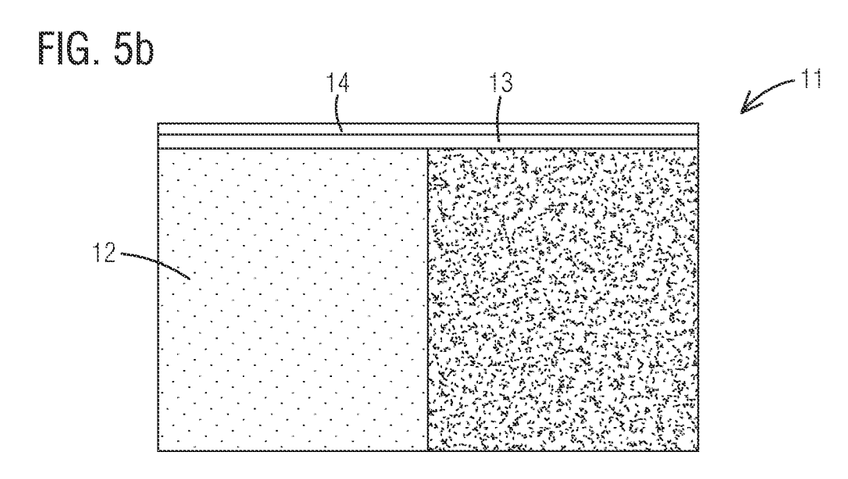

FIGS. 5*a* and 5*b* illustrate still further embodiments of construction panels 11 including a thermoplastic material, such as a rubber or polymer mat, as a performance layer adhered to a plywood base or structural layer 14 using an acrylic adhesive. FIG. 5*a* shows one such construction panel with a vinyl film adhered to one side, and with a more traditional roofing material such as an asphalt shingle type material applied to another side or portion. FIG. 5*b* shows alternate views of the construction panels. Examples of decorative layers 12 with varying aesthetic characteristics are shown in FIGS. 5*a*-5*b*, including decorative layers with different colors or tints, texturing, and/or an appearance of traditional roofing materials such as a shingle, shake, slate or tile.

Still further, in some embodiments, the present disclosure includes methods of creating a roof with a selected or desired decorative appearance and/or aesthetic characteristics; and in addition or alternatively, the present disclosure includes methods of forming a roofing system having a decorative layer with one or more aesthetic or decorative characteristics, which decorative layer can be removed and replaced without substantially modifying one or more functional characteristics of a performance layer of the roofing system. The decorative layer further can be removed and replace without requiring removal and/or replacement of the performance layer and/or a bas layer of the roofing system.

In an embodiment, a method comprises forming a roofing system, comprising a roof deck; a plurality of panels positioned along the roof deck, each of the panels comprising a base layer; a performance layer positioned over the base layer, the performance layer configured to provide one or more functional characteristics; and a decorative layer overlying the performance layer and configured to provide one or more aesthetic characteristics. In the embodiment, the decorative layer can comprise a first decorative layer, and the method can further comprise removing the first decorative layer from the performance layer of the roofing system. In some aspects of the embodiment, the method further comprises adding an additional or second decorative layer to the performance layer of the roofing system, wherein the removing the first decorative layer and the adding of the second decorative layer does not substantially modify the one or more functional characteristics of the performance layer of the roof system.

For example, in some aspects, the first and second layers can be configured with substantially the same or similar aesthetic characteristics or decorative appearances, such as for replacement of worn or damaged decorative layers, to maintain a substantially consistent appearance of the roof. In other aspects of the embodiment, the first and second decorative layers can have different appearances and/or aesthetic characteristics, enabling a change of the decorative appearance of the roof, without removal of the performance and/or structural layers of the panels, and without affecting the performance or functional characteristics of the performance layers of the panels.

In the embodiment, the one or more functional characteristics of the performance layer can include waterproofing, water shedding, impact resistance, wind resistance, fire resistance, microbial or algae resistance, and/or combinations thereof. In addition, the aesthetic characteristics of the first and/or second decorative layer comprise an appearance of shingles, shakes, slate, metal roofing, or tile roofing materials. In other embodiments, the aesthetic characteristics of the first and/or second decorative layers can include coloring, tinting, images, patterns, woven or non-woven appearances. In additional embodiments, the performance layer also can comprise coloring, tinting or other features to further provide underlying aesthetic characteristics to the panels.

In other embodiments, the first and second decorative layers will be releasibly applied over the performance layer using mechanical fasteners, reversible bonding or other adhered systems such as soluble adhesives or peel-and-stick adhesives, heat or thermal bonding, or combinations thereof. The first and second decorative layers also can be applied as successive layers, with one applied at least partially on top of the other to form a multi-layer decorative layer and to provide varying decorative appearances.

In still other embodiments, the present disclosure includes a method of forming a roofing system, comprising obtaining a plurality of roofing panels, each of the panels comprising a base layer, a performance layer positioned over the base layer and configured to provide one or more functional characteristics, and a decorative layer overlying the performance layer, the decorative layer configured to be removable from the performance layer and replaceable without replacement of the performance layer or base layer and having one or more aesthetic characteristics; and positioning and attaching or mounting the roofing panels on a roof deck to form a roof having an appearance with selected or desired aesthetic characteristics.

In some embodiments, the decorative layer can be removed from the performance layer and replaced with an additional decorative layer without changing or affecting the functional or performance characteristics of the performance layer. The decorative layer of each of the panels further generally will be releasibly applied over a corresponding performance layer such as by using mechanical fasteners, reversible bonding or other adhered systems such as soluble adhesives or peel-and-stick adhesives, heat or thermal bonding, or combinations thereof. In additional embodiments, the decorative layer can comprise multiple layers, and the method can include applying a first decorative layer over the performance layer of each panel, and applying a second decorative layer at least partially over the first decorative layer and performance layer of each panel, with the first and second decorative layers applied as successive layers, which can provide the panels with varying decorative appearances.

In some embodiments, the method can include applying the decorative layer over the performance layer of each panel at the time of manufacture of the panels, such as at a factory or before shipment of the panels. In other embodiments, the method can include applying the decorative layer over the performance layer of each panel in the field. Such application can be carried out prior to installation of the panels on the roof deck, or after the base layers of the panels have been secured to the roof deck. For example, the panels can be formed and shipped with each panel including a performance layer having selected performance or functional characteristics applied to a base layer, and one or more decorative layers having one or more selected aesthetic features or characteristics can be shipped separately for installation over the performance layers of the panels in the field.

In some further embodiments of the method, after formation of the roofing structure, the decorative layer can be removed, such as in the event of wear or damage to the decorative layer, or if it is desired or otherwise necessary to change the appearance of the roof; and a new decorative layer or a series of decorative layers can be applied in its place, without requiring removal of the performance and/or base layers and changing or otherwise affecting the functional characteristics of the performance layer of each panel. The new decorative layer or series of decorative layers can have substantially the same or can have different aesthetic characteristics.

In embodiments of the method, the at least one functional characteristic of the performance layer comprises waterproofing, water shedding, impact resistance, wind resistance, fire resistance, microbial or algae resistance, and/or combinations thereof. In addition, in embodiments, the aesthetic characteristics of the decorative layer can include an appearance of traditional roofing materials, such as shingles, shakes, slate, metal roofing, or tile roofing materials; and in other embodiments, the aesthetic characteristics of the decorative layer can include coloring, tinting, images, patterns, woven or non-woven appearances. In still further embodiments, the performance layer also can comprise coloring, tinting or other features to further provide underlying aesthetic characteristics to the panels.

The present disclosure has been described in terms of example embodiments believed to represent best modes of carrying out the present disclosure. It will be understood by the skilled artisan, however, that a wide gamut of additions, deletions, and modifications, both subtle and gross, may be made to the illustrated examples without departing from the spirit and scope of the present disclosure that they embody.

The invention claimed is:
1. A roofing system comprising:
a roof deck or substrate;
a plurality of roofing panels attached in series along the roof deck or substrate, each roofing panel having a selected decorative appearance and comprising:
a base layer including plywood, oriented strand board, structural insulated panels, metal, standing seam panels, cement, quartz, foam panels, polymers, or combinations thereof;

a performance layer overlying the base layer, the performance layer configured to provide one or more performance characteristics to the roofing system, including waterproofing, water shedding, impact resistance, wind resistance, fire resistance, microbial or algae resistance, and/or combinations thereof; and a decorative layer overlying the performance layer, the decorative layer having at least one aesthetic characteristic selected and configured to provide the selected decorative appearance to the roofing panel;

wherein the decorative layer is selectively removable from the performance layer and replaceable with another decorative layer without substantially modifying the one or more functional characteristics of the performance layer so that the aesthetic characteristics imparted to the roofing panel by the decorative layer can be altered to alter or maintain the decorative appearance of the roofing panel without removal and/or replacement of the roofing panel or the performance layer or the base layer.

2. The roofing system of claim 1 wherein the aesthetic characteristics of the decorative layer comprise an appearance of shingles, shakes, slate, metal roofing, or tile roofing materials.

3. The roofing system of claim 1 wherein the decorative layer is releasably attached to the performance layer with removable fasteners, debondable adhesives, or combinations thereof.

4. The roofing system of claim 1 wherein the aesthetic characteristics of the decorative layers of a plurality of the roofing panels installed together along the roof deck or substrate define an overall decorative appearance of a roof formed by the roofing system.

5. The roofing system of claim 1 wherein the performance layer comprises one or more of a thermoplastic polymer material, metal, composite materials, or combinations thereof.

6. The roofing system of claim 1 wherein the performance layer comprises polyethylene, polypropylene, acrylic, PET, polystyrene, polyvinyl chloride, polyisoprene, polyvinyl butyral, polycarbonates, multilayer thermoplastic constructions, or combinations thereof with and without fillers.

7. The roofing system of claim 1, wherein the base layer is attached to the roof deck or substrate by bonding using sealant or adhesive materials, thermal bonding, hook and loop or similar connectors, fasteners, mechanical interlocking systems, or combinations thereof.

8. The roofing system of claim 1, wherein the roofing panels of the plurality of roofing panels are positioned along the roof deck in a substantially abutting arrangement, and wherein adjacent panels are coupled together along joints defined therebetween by adhesives or thermal bonding.

* * * * *